United States Patent Office 3,790,614
Patented Feb. 5, 1974

3,790,614
HERBICIDAL IMIDO ESTERS
Paulus P. Montijn, Amsterdam, Netherlands, and Ernest Haddock, Sheppey, Kent, England, assignors to Shell Oil Company, New York, N.Y.
No Drawing. Filed Dec. 6, 1971, Ser. No. 205,319
Claims priority, application Great Britain, Sept. 14, 1971, 59,718/71
Int. Cl. C07c *119/20*
U.S. Cl. 260—453 R  1 Claim

ABSTRACT OF THE DISCLOSURE

Ethyl N-benzoyl - 3,4 - dichloroanilinopropionimidate monohydrochloride, useful for controlling undesired plant growth.

---

This invention relates to novel herbicidal ethyl 2-(N-benzoyl - 3,4 - dichloroanilino)-propionimidate monohydrochloride.

Under modern methods of agricultural husbandry it has been found possible to leave cereal crops standing until full ripening of the ears has taken place. This was not the case formerly when harvesting was more dependent on weather conditions and took place over a longer period. Unfortunately wild oat matures more rapidly than grain crops and, when this weed is present, a proportion of its seeds are now shed into the soil before harvesting takes place; by this means serious infestation of arable land by wild oat has occurred. Moreover, it is very difficult to separate wild oat seeds from the seeds of other grain crops and the presence of wild oat, in, for example, a sample of seed wheat seriously affects its merchantable quality. It has now been discovered that ethyl 2 - (N-benzoyl-3,4-dichloroanilino)-propionimidate monohydrochloride has useful selective herbicidal properties, and in particular gives improved control of wild oat.

The novel compound of this invention may be utilized alone, or in the form of a composition which comprises it, together with a carrier or a surface active agent, or both a carrier and a surface active agent.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating pesticides may be used as carrier.

Suitable solid carriers are natural and synthetic clays and silicates for example natural silicas such as diatomaceous earths; magnesium silicates, for example, talcs; magnesium aluminum silicates, for example, attapulgites and vermiculites; aluminum silicates, for example kaolinites, montmorillonites and micas; calcium carbonates; calcium sulfate; synthetic hydrated silicon oxides and synthetic calcium or aluminum silicates; elements such as for example, carbon and sulfur; natural and synthetic resins such as, for example, coumarone resins, polyvinyl chloride and styrene polymers and copolymers; solid polychlorophenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosene, light mineral oils; chlorinated hydrocarbons, such as for example, carbon tetrachloride, perchloroethylene, trichloroethane, including liquified normally vaporous gaseous compounds. Mixtures of different liquids are often suitable.

The surface active agent may be an emulsifying agent or a dispersing agent or a wetting agent; it may be nonionic or ionic. Any of the surface-active agents usually applied in formulating herbicides or insecticides may be used. Examples of suitable surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulfates or sulfonates of these condensation products; alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75 percent by weight of toxicant and usually contain, in addition to solid carrier, 3–20 percent by weight of a dispersing agent and, where necessary, 0–10 percent by weight of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½ to 10 percent by weight of toxicant. Granules are usually prepared to have a size between 10 and 100 BS mesh, and may be manufactured by agglomeration or impregnation techniques. Generally, granules will contain ½–25 percent by weight toxicant and 0–10 percent by weight of additives such as stabilizers, slow release modifiers and binding agents. Emulsifiable concentrates usually contain, in addition to the solvent and, when necessary, co-solvent, 10–50 percent by volume toxicant, 2–20 percent by volume emulsifiers and 0–20 percent by volume of appropriate additives such as stabilizers, penetrants and corrosion inhibitors. Suspension concentrates are compounded so as to obtain a stable, non-sedimenting, flowable product and usually contain 10–75 percent by weight toxicant, 0.5–15 percent by weight of dispersing agents, 0.1 to 10 percent by weight of suspending agents such as protective colloids and thixotropic agents, 0–10 percent by weight of appropriate additives such as defoamers, corrosion inhibitors, stabilizers, penetrants and stickers, and as carrier, water or an organic liquid in which the toxicant is substantially insoluble; certain organic salts may be dissolved in the carrier to assist in preventing sedimentation or as antifreeze agents for water.

The compositions may contain other ingredients, for example, protective colloids such as gelatin, glue, casein, gums, cellulose ethers, and polyvinyl alcohol; thixotropic agents, e.g., bentonites, sodium polyphosphates; stabilizers such as ethylenediamine tetra-acetic acid, urea, triphenyl phosphate; other herbicides or pesticides; and stickers, for example non-volatile oils.

Aqueous dispersions and emulsions, for example, compositions obtained by diluting a wettable powder or an emulsifiable concentrate also can be used. The said emulsions may be of the water-in-oil or of the oil-in-water type, and may have a thick "mayonnaise"-like consistency.

The invention is illustrated further in the following examples.

EXAMPLE I

Preparation of 2-(N-benzoyl-3,4-dichloroanilino) propiononitrile 10.76 grams (0.05 mole) of 2-(3,4-dichloroanilino) propiononitrile and 25 milliliters of dry toluene were introduced into a three-necked 100 milliliter reaction vessel, provided with a magnetically driven stirrer, a supply funnel, reflux condenser, and gas inlet tube extending into the liquid. The solution was heated to reflux, whereupon 7.37 grams (0.0525 mole) of benzoyl chloride was added dropwise in two hours and refluxing was continued for another five hours, while a slow stream of nitrogen was passed through the solution to remove the hydrogen chloride formed in the reaction.

According to GLC analysis, 97 percent of the starting material had been converted into the desired product. After removal first of the toluene at 30–40° C. and 12 mm. Hg, and then of the excess of the benzoyl chloride at 100–110° C. and 0.2–0.3 torr, a brown crystalline residue was obtained weighing 15.5 grams (purity 95 percent). Crystallization from carbon tetrachloride yielded 12.9 grams of 2-(N-benzoyl-3,4-dichloroanilino)propiononitrile having a purity of 99 percent, which corresponds to a yield of 81 percent. The product melted at 122–123° C.

*Analysis.*—Found (percent): C, 60.2; H, 3.8; Cl, 21.9. $C_{16}H_{12}N_2OCl_2$ requires (percent). C, 60.19; H, 3.76; N, 8.78; Cl, 22.26.

Preparation of ethyl 2-(N-benzoyl-3,4-dichloroanilino)-propionimidate 3.2 grams (0.01 mole) of 2-(N-benzoyl-3,4-dichloroanilino)-propiononitrile was dissolved in a mixture of 10 milliliters of absolute ethanol, 10 milliliters of toluene, and 10 milliliters of anhydrous ethyl ether. The resulting solution was saturated with dry hydrogen chloride at 0° C., cooled to −20° C., and allowed to stand at this temperature for 48 hours, while any access of moisture was precluded. Subsequently, the solvents (and ethanol) were evaporated at 35° C. and a pressure of 20 mm. Hg. and the residue was dissolved in absolute ethanol. Anhydrous ethyl ether (75 milliliters) was then added, and the mixture was cooled to −20° C. After standing for one hour, the crystals formed were filtered off and freed from ether and alcohol by heating at 40° C. and 60 mm. Hg.

In this way 2.37 grams of the monohydrochloride of ethyl 2-(N-benzoyl-3,4 - dichloroanilino)propionimidate was obtained, which corresponds to a yield of 58 mole percent; M.P. 130–133° C.

*Analysis.*—Found (percent): C, 51.0; H, 4.8; N, 6.9; Cl, 23.8. $C_{18}H_{19}N_2O_2Cl_3$ requires (percent): C, 53.80; H, 4.73; N, 6.97; Cl, 26.52.

EXAMPLE II

Herbicidal activity

The herbicidal activity of ethyl 2-(N-benzoyl-3,4-dichloroanilino)propionimidate monohydrochloride was evaluated against various different plant species by the following method:

The test plants were grown in 7 centimeter diameter plastic pots containing a steam-sterilized, modified John Innes compost mixture in which half the peat, by loose bulk, had been replaced by vermiculite. A solution of the test compound in 1:1 volume for volume acetone/water containing 0.2 percent by weight of an alkylphenol/ethylene oxide condensate, available under the trade name Triton X–155, was sprayed onto the test plants at 7 different dosage levels in the range 0.05–5 kilograms per hectare. The herbicidal effects of the compound were assessed visually 10 days after spraying, and the results used to calculate the dosage levels necessary to produce a 10 percent, 50 percent and 90 percent reduction in the fresh weight of stem and leaf of the test plants. These dosage levels are set out in the following table.

TABLE

| Plant species | Dosage levels, kilogram per hectare of— | | |
|---|---|---|---|
| | 10% | 50% | 90% |
| Oat (*Avena sativa*) | 0.11 | 0.81 | 5.75 |
| Wild oat (*Avena fatua*) | 0.20 | 1.00 | 5.02 |
| Wheat (*Triticum vulgare*) | >10 | >10 | >10 |
| Barley (*Hordeum vulgare*) | 1.54 | 8.40 | >10 |
| Maize (*Zea mays*) | 3.77 | >10 | >10 |
| Rye grass (*Lolium perenne*) | >10 | >10 | >10 |
| Cotton (*Gossypium barbadense*) | >10 | >10 | >10 |
| Kale (*Brassica oleracea*) | >10 | >10 | >10 |
| Sugar beet (*Beta vulgaris*) | >10 | >10 | >10 |
| Carrot (*Daucus carota*) | >10 | >10 | >10 |
| Lucerne (*Medicago sativa*) | 1.98 | 6.84 | >10 |
| Chicory (*Cicorium endivia*) | >10 | >10 | >10 |
| Plantain (*Plantago lanceolata*) | >10 | >10 | >10 |

We claim as our invention:
1. Ethyl 2-(N-benzoyl-3,4-dichloroanilino)-propionimidate monohydrochloride.

References Cited

UNITED STATES PATENTS

| 3,598,859 | 8/1971 | Yates et al. | 260—471 A |
| 3,628,944 | 12/1971 | Rumanowski | 260—453 R |
| 3,660,461 | 5/1972 | Roll | 260—465 D |
| 3,247,206 | 4/1966 | Lassiter et al. | 260—465 D |
| 3,414,614 | 12/1968 | Julia | 260—465 D |
| 3,549,349 | 12/1970 | Gramlich | 71—118 |
| 3,457,294 | 7/1969 | Crovetti et al. | 71—105 |
| 2,927,126 | 3/1960 | Pursglove | 71—103 |

OTHER REFERENCES

Wada et al.: "Synthesis of Plant Growth Subs." (1959), CA, 54, p. 19548 (1960).

Solomko et al.: "Sulfonanilides. XIV Nitriles, etc." (1964), CA, 61, pp. 8220–21 (1964).

GLENNON H. HOLLRAH, Primary Examiner

U.S. Cl. X.R.

71—118, DIG. 1; 260—465.4